July 6, 1948.                J. N. WOLFRAM                 2,444,622
                           COUPLING FOR TUBES
                          Filed Sept. 22, 1944
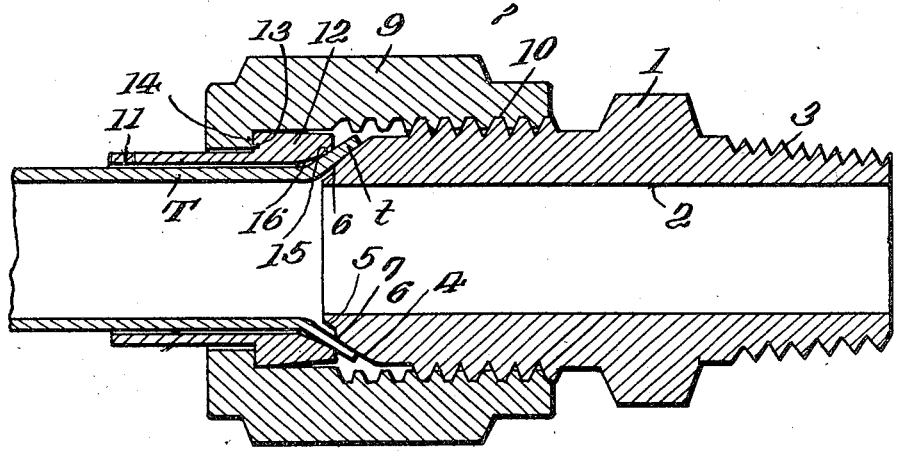
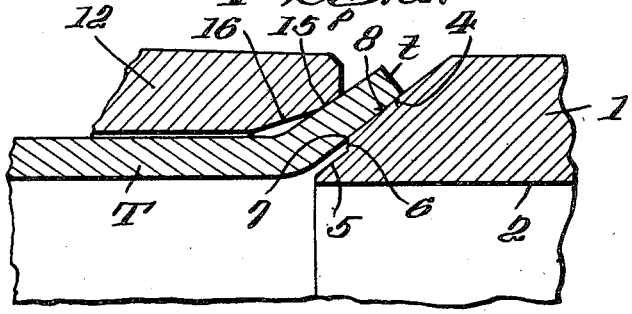
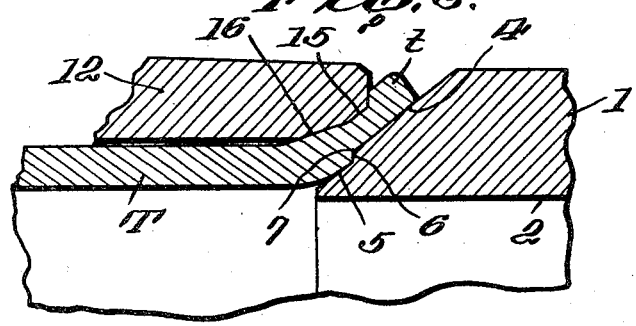
Inventor
John N. Wolfram
By Mason, Porter & Diller
Attorneys Patented July 6, 1948

2,444,622

UNITED STATES PATENT OFFICE 2,444,622

COUPLING FOR TUBES

John N. Wolfram, Cleveland, Ohio, assignor to The Parker Appliance Company, Cleveland, Ohio, a corporation of Ohio Application September 22, 1944, Serial No. 555,306

1 Claim. (Cl. 285—122)

This invention relates to new and useful improvements in tube couplings and more particularly to an improvement in a coupling adapted for clamping the flared end of a metal tube such as is typified in United States Letters Patent No. 2,212,183, granted Arthur L. Parker, August 20, 1940.

An object of the invention is to provide a coupling of the above type wherein the male seat is shaped so as to provide an outer conical portion which is initially engaged by the flared end of the tube and an inner conical portion which is only contacted with by the flared end of the tube upon the final closing pressure of the coupling members.

A further object of the invention is to provide a coupling of the above type wherein the inner conical portion of the male seat is offset inwardly from the outer conical portion so as to provide a relatively sharp edge which is embedded in the flared end of the tube during the clamping of the tube against the male seat.

A still further object of the invention is to provide a coupling of the above type wherein the female clamping part is so shaped as to initially contact with the outer face of the flared end of the tube in a region directly opposed to the outer conical portion of the male seat.

These and other objects will in part be obvious and will in part be hereinafter more fully disclosed.

In the drawings,

Fig. 1 is a longitudinal sectional view through a tube coupling embodying the improvements with the tube in place and the coupling hand tightened.

Fig. 2 is an enlarged view of the flared end of the tube and the clamping portions of the coupling showing more or less diagrammatically the shaping of the parts and the position thereof when the female coupling member has been hand tightened against the flared end of the tube holding the same firmly against the male seat.

Fig. 3 is a view similar to Fig. 2 but showing the coupling closed by the usual torque pressure.

The invention is directed to a coupling for tubes having the ends thereof flared. In the drawings the tube is indicated at T and the flared end of the tube at $t$. The coupling as illustrated in the drawing includes a coupling member 1 having a bore 2 therethrough. The outer end of this coupling 1 is threaded at 3 for attachment to any suitable device. This coupling member 1 is usually referred to as the body member to which the tube is to be connected.

The coupling 1 has at its inner end a male seat which includes an outer conical portion 4 and an inner conical portion 5. As shown in the drawings, these conical portions are on substantially the same angle but the inner conical portion 5 is offset inwardly from the conical portion 4. The shoulder 6 between these conical portions terminates in a relatively sharp edge 7. The inner surface 8 of the flared end $t$ of the tube contacts initially with the outer conical portion 4 of the male seat and the angle of the male seat in this region is substantially the same as the angle of the inner flared face of the tube.

The flared end of the tube is clamped against the male seat by the coupling member 9 which, as shown, is in the form of a nut having a threaded engagement 10 with the body member. Associated with the nut 9 is a clamping sleeve 11. Said clamping sleeve is provided with a clamping head 12 at the outer end of which is a shoulder 13 adapted to engage a shoulder 14 on the nut. The inner end of the head 12 of the clamping sleeve is shaped so as to provide a conical portion 15 which engages the outer face of the flared end of the tube in the region directly opposed to the conical portion 4 of the male seat.

The clamping head 12 is cut away so as to provide a conical portion 16. The preferred angle of the conical portion 15 is thirty-three degrees when the conical portion 4 of the male seat is approximately thirty-seven degrees. The angle of the conical portion 16 is preferably eighteen and one-half degrees. These angles are merely mentioned to indicate the relative shaping of the parts.

When the nose end of the head 12 is moved by the nut against the flared end of the tube, pressure is exerted against said flared end by the conical portion 15 of the head only. The clamping head in the region of the conical portion 16 is out of contact with the outer face of the flared end of the tube and likewise the inner conical portion 5 of the male seat is out of contact with the inner face of the flared end of the tube.

When the coupling is closed the solid head 12 of the sleeve will be forced against the flared end of the tube and this will force the tube against the male seat. The sharp edge 7 between the conical portions of the male seat will become embedded in the flared end of the tube. Likewise, as the head moves toward the male seat the conical portion 15 will be embedded in the metal of the flared end of the tube and the conical portion 16 on said head will be brought into contact with the flared end of the tube. This contact of the conical portion 16 with the flared end of the tube and the contact of the conical portion 5 with the flared end of the tube will determine the final torque pressure for a tight clamping of the flared end of the tube. Furthermore, this relatively short area in the conical portion 15 of the head of the sleeve enables a very high unit seating pressure to be developed at a rather low turning torque of the nut 9.

When the couplings are closed the conical surface 16 on the clamping head of the sleeve produces a sort of wedging action which tends to force the metal of the tube over the sharp edge 7 and thus establishes a tight seal. In other words, the metal of the flared end of the tube flows over the sharp edge and establishes a clear line contact seal.

The conical portion 5 of the male seat provides an additional sealing surface and at the same time provides an additional support for the tube adjacent the sharp edge 7, thereby limiting the extent of the embedding of the sharp edge 7 into the tube. This supporting surface 5 also prevents excessive extrusion of the tube which might otherwise tend to close up or reduce the inside diameter of the tube.

While the conical portion 5 of the male seat is shown as on the same angle as the conical portion 4, it will be understood that the angle of this conical portion 5 may be varied so long as a sharp line 7 between the conical surfaces is maintained and so long as the conical surface 5 is initially out of contact with the flared end of the tube.

It is obvious that many changes may be made in the details of construction without departing from the spirit of the invention as set forth in the appended claim.

I claim:

A coupling for metal tubes having the ends thereof flared comprising coupling members having a threaded connection, one of said members having a seat against which the flared end of the tube is clamped, said seat having an inner conical portion and an outer conical portion, said outer conical portion being offset outwardly of the inner conical portion so as to provide a shoulder therebetween, terminating at the outer conical portion and so that the inner portion of the flared end of the tube contacts initially solely with said outer conical portion of the seat, the other coupling member having associated therewith a clamping head provided with an outer conical portion disposed radially outwardly from the shoulder so as to initially engage the outer face of the flared end of the tube in the region opposed to the outer conical portion on the seat, said head having an inner conical clamping portion initially out of engagement with the flared end of the tube whereby when the coupling is closed the outer portion of the flared end of the tube will be deformed and the shoulder embedded in said flared end of the tube.

JOHN N. WOLFRAM.

REFERENCES CITED

The following references are of record in the file of this patent:

UNITED STATES PATENTS

| Number | Name | Date |
|---|---|---|
| 2,289,382 | Parker | July 14, 1942 |

FOREIGN PATENTS

| Number | Country | Date |
|---|---|---|
| 437,510 | Great Britain | Oct. 20, 1935 |